United States Patent
Sjöberg et al.

(10) Patent No.: US 8,555,665 B2
(45) Date of Patent: Oct. 15, 2013

(54) METHOD FOR OPERATING A VARIABLE DISPLACEMENT COMPRESSOR AND SYSTEM WITH A VARIABLE DISPLACEMENT COMPRESSOR

(75) Inventors: Andreas Sjöberg, Göteborg (SE);
Andreas Roupè, Ytterby (SE)

(73) Assignee: Volvo Technology Corporation, Göteborg (SE)

( * ) Notice: Subject to any disclaimer, the term of this patent is extended or adjusted under 35 U.S.C. 154(b) by 936 days.

(21) Appl. No.: 12/532,155

(22) PCT Filed: Mar. 20, 2007

(86) PCT No.: PCT/SE2007/000270
§ 371 (c)(1),
(2), (4) Date: Jan. 21, 2010

(87) PCT Pub. No.: WO2008/115101
PCT Pub. Date: Sep. 25, 2008

(65) Prior Publication Data
US 2010/0145527 A1      Jun. 10, 2010

(51) Int. Cl.
*F25B 49/00*      (2006.01)

(52) U.S. Cl.
USPC .............. 62/228.1; 62/228.3; 62/230; 417/19

(58) Field of Classification Search
USPC .......................... 62/228.1, 228.3, 230; 417/19
See application file for complete search history.

(56) References Cited

U.S. PATENT DOCUMENTS

| | | | |
|---|---|---|---|
| 4,578,960 A | 4/1986 | Nishi et al. | |
| 5,385,029 A | 1/1995 | Yamanaka et al. | |
| 5,924,296 A | 7/1999 | Takano et al. | |
| 6,484,520 B2 | 11/2002 | Kawaguchi et al. | |
| 2003/0097851 A1 | 5/2003 | Adaniya et al. | |
| 2006/0272343 A1 | 12/2006 | Takahashi et al. | |
| 2006/0275145 A1* | 12/2006 | Takahashi et al. | ......... 417/222.2 |

FOREIGN PATENT DOCUMENTS

EP            1647711 A2       4/2006

* cited by examiner

*Primary Examiner* — Marc Norman
(74) *Attorney, Agent, or Firm* — WRB-IP LLP

(57) ABSTRACT

A system and a method for operating a variable-displacement compressor are provided wherein a volume of a compression chamber of at least one cylinder is varied during a compression cycle, wherein during the cycle the at least one cylinder is alternately coupled to a low pressure side and a high pressure side of the compressor. A first thermodynamic state of the low pressure side and a second thermodynamic state of the high pressure side can be estimated and a current compression ratio $$\left(\frac{v_{in}}{v_{out}}\right)$$

of the compressor can be estimated. Accordingly, a compressor displacement (D) as a function of the compression ratio $$\left(\frac{v_{in}}{v_{out}}\right)$$

can be calculated. From this, a compressor torque (M) depending on the calculated displacement (D) can be computed, and the compressor torque (M) can be provided to a control unit for operating the compressor or an engine coupled to the compressor.

21 Claims, 4 Drawing Sheets

METHOD FOR OPERATING A VARIABLE DISPLACEMENT COMPRESSOR AND SYSTEM WITH A VARIABLE DISPLACEMENT COMPRESSOR

BACKGROUND AND SUMMARY

The invention relates to a method for operating a variable displacement compressor and a system with a variable displacement compressor.

Variable displacement compressors are known in the art. Variable displacement compressors of the swash-plate type are widely used in automotive air conditioners. Such compressors include a displacement control mechanism, which operates to maintain the exit pressure of an evaporator or the suction pressure of a compressor associated with the exit pressure at a predetermined target value. The exit pressure of an evaporator or the suction pressure of a compressor associated with the exit pressure reflects the magnitude of the cooling load. The variable control mechanism controls the exit pressure of the evaporator or the suction pressure to adjust the inclination angle of the swash plate of the compressor which adjusts the displacement of the compressor. A compressor used in vehicles is usually driven by the vehicle engine. Being a main consumer of engine power, the load of the compressor to the engine has to be reduced under exceptional conditions, e.g. during acceleration or moving uphill or when starting the engine.

U.S. Pat. No. 4,578,960 B2 teaches a displacement control method for a variable displacement compressor which is incorporated in a refrigerant circuit of a vehicle air conditioning system. The displacement of the compressor is switched dependent on the temperature of the refrigerant. A control valve is provided for changes of the displacement of the compressor by changing the valve opening degree. The displacement is switched to a value between 30-50% of the maximum displacement if the temperature of the refrigerant drops below $-1°$ C. If the temperature of the refrigerant is above $3°$ C., the compressor is operated at its maximum displacement.

The U.S. Pat. No. 6,484,520 B2 discloses a displacement control apparatus, wherein a variable displacement compressor of a swash plate type is employed. A drive shaft of the compressor is driven by a vehicle engine. A control valve changes the displacement of the compressor. An air conditioner controller produces a torque setting signal to the compressor controller which changes the valve opening and subsequently the displacement of the compressor. Thus, the compressor is controlled according to the torque.

It is desirable to provide a reliable and fast method for operating a variable displacement compressor. It is also desirable to provide a reliable system for operating a compressor. It is also desirable to provide a suitable computer program as well as a computer program product.

According to a first aspect of the invention a method for operating a variable-displacement compressor is provided, wherein a volume of a compression chamber of a cylinder is varied during a compressor cycle, also called compression cycle, wherein during the cycle said cylinder is alternately coupled to a low pressure side and a high pressure side of said compressor. The method comprises the steps of estimating a first thermodynamical state of said low pressure side and a second thermodynamical state of said high pressure side, estimating a current compression ratio of said compressor, calculating said displacement as a function of said compression ratio, estimating a compressor torque depending on the calculated displacement, and providing said compressor torque to a control unit for operating the compressor or for operating an engine coupled to the compressor. The control unit can operate the compressor directly or indirectly. For instance, the control unit can be an engine control unit where the engine drives the compressor. Knowing the displacement is useful when estimating the compressor torque, particularly when the compressor is employed in an air conditioning system of a vehicle. If the compressor torque is known, the control unit, such as an electronic control unit (ECU) or an engine control unit of a vehicle or the like, can easily compensate for the torque, thus making the control of the respective component, for instance the engine, easier. The drivability of the vehicle can also be improved. Particularly, the drivability is improved in the way that jerk problems are decreased. Other benefits gained by better compressor torque estimation which can be sent to an engine management system of a vehicle are decreased emissions of the engine as well as a decreased fuel consumption of the vehicle.

Additionally, the preferred method can easily be transferred to other systems. When employed into an air conditioning system, the method allows for better controlling of an evaporator coupled to the air conditioning system, particularly for better controlling of the evaporator temperature. Control of the evaporator can mean e.g. control of a fluid temperature, e.g. air temperature directly downstream the evaporator between the evaporator and the compressor and/or control of a coolant pressure between the evaporator and the compressor, which pressure can preferably correlate with the air temperature. Preferably, the evaporator can also be controlled by a control unit. For instance, the compressor control and torque estimation can be placed in the same control unit as the engine management software, or, for instance, a climate control unit can control the evaporator. A fluid which is compressed in the compressor can be a gas or a liquid.

Other than non-physical models, which depend strongly on measured data, the proposed method is based on a physical model of the compressor. As a physical model, the method is rather independent of the ambient environment of the compressor. A transfer of the method to another system can be done easily and fast, which is time and cost efficient. Knowing the actual displacement of the compressor is not only favorable for estimating the compressor torque but also for easier controlling an engine of an engine driven compressor, for instance when the compressor is coupled to a vehicular air conditioning system. Problems with a wind-up of regulator integrated parts of an evaporator, which can arise if the displacement is not known, can be avoided. Such problems can occur if the compressor is already at its maximum displacement and the requested cooling power is higher than can be provided by the compressor.

Preferably, the compressor is a swash-plate type compressor. However, other variable displacement compressor types are possible.

Only few, preferably three, signals are needed for the modeling on which the preferred method is based. The additional parameters for the model can be easily determined by thermodynamic property tables of the fluid being compressed in the compressor, such as a common refrigerant 1,1,1,2-tetrafluorethane, also known under the trade name R-134a, for example. This is reasonable, if the fluid cannot thermodynamically be treated as an ideal gas. If a fluid is used which can thermodynamically be treated as ideal gas, the parameters can be computed by thermodynamic formulas containing constant thermal capacities as known in the art and which can be found in thermodynamic textbooks.

The state on the low pressure side of the compressor can be determined with the help of an ambient temperature, particular an air temperature, downstream after an evaporator connected to the compressor inlet. The state on the high pressure side can be determined with the help of a measured pressure and the assumption that the compressor work is isentropic with a very high efficiency Additionally, to estimate the torque, the engine speed has to be known. It is not necessary to know the mass flow or the actual swash-plate angle, which parameters are difficult to determine in praxis. Favorably, the method can be used quite general, which means that the estimation of the compressor torque does not depend on the ambient in which the compressor is utilized. For example, it can be utilized in various vehicles or different engines. Further, there is no influence on the model in different climes, so the model can be applied to compressors which are used in an air conditioning system in different countries all around the world. If a compressor of similar type is used, there is no need to build a new model. Developing a new model is very time consuming. Therefore, a general model such as used in the preferred method is cost-efficient and time-saving.

Only a few input signals are necessary. Thus, the model is easy to analyze. Furthermore, only a few sensors are necessary which allow for an economic air conditioning system, particularly in high-volume series which are typical in vehicle production.

Favorably, said first thermodynamical state on the low pressure side is extracted at least from a temperature, characteristic of a fluid temperature at an inlet of the compressor. Preferably, the temperature is an air temperature measured at an evaporator being in fluid connection with said inlet. From said temperature an input pressure value of said fluid can be determined. It might be possible to combine one of the temperature and pressure with another appropriate measure, for instance air flow or the like, to get an improved estimate.

A specific enthalpy, a specific volume, a specific internal energy and a specific entropy of said fluid at said inlet can be determined, depending on said temperature value and said pressure value. These parameters can be extracted from thermodynamic property tables for the fluid, e.g. the refrigerant being compressed in the compressor.

Favorably, said second thermodynamical state on the high pressure side is extracted from a pressure value of the fluid at an outlet on the high pressure side of said compressor.

Preferably, the pressure value is measured at the outlet of the compressor. An entropy at said outlet is set equal or at least approximately equal to an entropy at the inlet. An enthalpy can be determined depending on said pressure value and said entropy. An isentropic efficiency can also be calculated.

An outlet temperature value of said fluid at said outlet is determined depending on said enthalpy and said pressure value.

Finally, a specific enthalpy, a specific volume and a specific internal energy of said fluid at said outlet can be determined, depending on said temperature value and said pressure value. The parameters can be drawn from thermodynamic property tables describing the thermodynamic properties of the fluid compressed by the compressor.

Said displacement of the compressor can easily be determined as a product of a volumetric efficiency and said compression ratio and a constant characterizing a constant volume in the size of the minimum displacement.

Said compressor torque can be extracted from an energy balance on the compressor.

The torque can be extracted from said calculated displacement, said specific enthalpy at said inlet, said specific enthalpy at said outlet, said specific energy at said inlet and said specific energy at said outlet. The torque can be compensated for operating said compressor efficiently, particularly in a vehicle.

According to another aspect of the invention, a system comprising a variable displacement compressor is provided, wherein an evaporator is in fluid connection with an inlet of said compressor and a condenser in fluid connection with an outlet of said compressor. The compressor is coupled to an operation unit capable of operating said compressor according to a method according to an aspect of the present invention, providing a compressor torque depending on a calculated compressor displacement.

Preferably, a temperature sensor is coupled to the evaporator. By this, an input temperature of the fluid being compressed in the compressor, particularly a refrigerant such as tetrafluorethane, can be measured. Favorably, a pressure on the high pressure side of the compressor can be measured with a pressure sensor which is coupled to said outlet of said compressor. The compressor is driven by a motor, such as an electric motor, or an engine, particularly a vehicle engine, and the engine speed can easily be measured with an appropriate speed sensor. With these signals, the displacement of the compressor can be calculated and a torque of the compressor estimated.

In a preferred embodiment, the compressor is in fluid connection with an automotive based air conditioning system.

According to another aspect of the invention, a computer program is proposed, comprising a computer program code adapted to perform a method for use in the preferred method according to any of the aspects described above, when said program is run on a programmable microcomputer.

The computer program can favorably be adapted to be downloaded to a control unit or one of its components when run on a computer which is connected to the internet.

Preferably, a computer program product stored on a computer readable medium, comprising a program code for use in a method according to anyone of the aspects of the preferred method on a computer.

According to another aspect of the invention, a computer program product stored on a computer readable medium is proposed, comprising a program code for use in a method comprising at least the steps of estimating a first thermodynamical state of said low pressure side and a second thermodynamical state of said high pressure side, estimating a current compression ratio of said compressor, calculating a compressor displacement as a function of said compression ratio, estimating a compressor torque depending on said calculated displacement, and providing said compressor torque to a control unit.

BRIEF DESCRIPTION OF THE DRAWINGS

The present invention together with the above-mentioned and other advantages may best be understood from the following detailed description of the embodiments, but not restricted to the embodiments, wherein is shown schematically.

DETAILED DESCRIPTION

Figure 1:
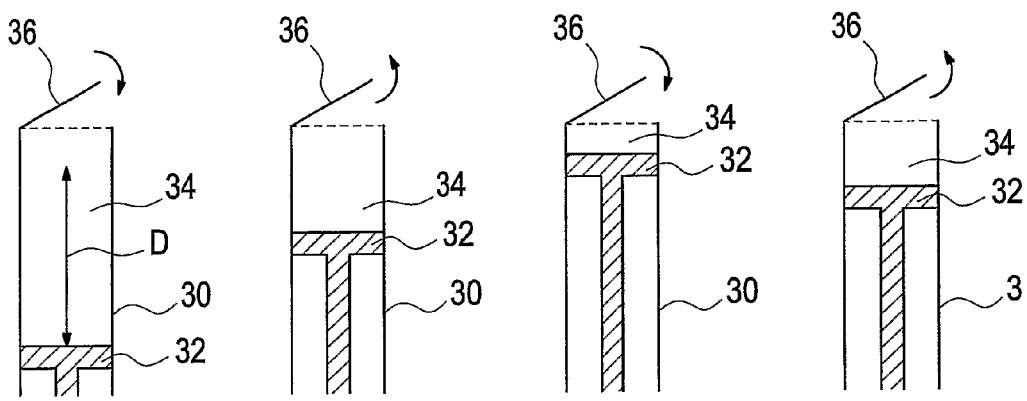
FIGS. 1$a$-1$d$ various states during an ideal compression cycle.

In the drawings, equal or similar elements are referred to by equal reference numerals.

The following propositions from the thermodynamics have been used in the modeling on which the preferred method is based:

Proposition 1: The thermodynamic state of a compressible system can be completely specified if two independent thermodynamic properties are known.

Proposition 2: Energy flow entering the system minus energy flow leaving the system is equal to the change in the total energy of the system, i.e.

$$\dot{E}_{in} - \dot{E}_{out} = \left(\frac{dE}{dt}\right)_{system} \quad (e1)$$

The terms in the energy balance contain energy forms according to, $$\dot{E}_{in} = \dot{Q}_{in} + \dot{W}_{in} + \dot{m}\left(h_{in} + gz_{in} + \frac{v_{in}^2}{2}\right) \quad (e2)$$

$$\dot{E}_{out} = \dot{Q}_{out} + \dot{W}_{out} + \dot{m}\left(h_{out} + gz_{out} + \frac{v_{out}^2}{2}\right) \quad (e3)$$

$$\left(\frac{dE}{dt}\right)_{system} = \left(\frac{d(mu)}{dt}\right)_{system} + \left(\frac{d(mgz)}{dt}\right)_{system} + \left(\frac{d\left(m\frac{v^2}{2}\right)}{dt}\right)_{system} + \left(\frac{d\left(I\frac{\omega^2}{2}\right)}{dt}\right)_{system} \quad (e4)$$

For clarity, the parameters used in the above-quoted and in the following equations (e1)-(e31) are listed below:

| | | |
|---|---|---|
| D | displacement | [m³] |
| E | energy | [J] |
| $\dot{E}$ | power | [W] |
| g | gravitational acceleration | [m/s²] |
| h | specific enthalpy | [J/kg] |
| I | inertia | [kgm²] |
| k | gear ratio | |
| K | volume factor | [m³] |
| m | mass | [kg] |
| $\dot{m}$ | mass rate | [kg/s] |
| M | compressor torque | [Nm] |
| n | number of cylinders in the compressor | |
| P | pressure | [Pa] |
| Q | heat | [J] |
| $\dot{Q}$ | heat power | [W] |
| s | specific entropy | [kJ/kgK] |
| t | time | [s] |
| T | temperature | [° C.] |
| $T_{evap}$ | air temperature after evaporator | [° C.] |
| $T_{sat}$ | saturation temperature at low pressure | [° C.] |
| $T_{sh}$ | superheat of tetrafluorethane before compression | [° C.] |
| u | specific internal energy | [J/kg] |
| v | specific volume | [m³/kg] |
| V | volume | [m³] |
| $\omega_{comp}$ | compressor speed | [rad/s] |
| $\omega_{engine}$ | engine speed | [rad/s] |
| W | work | [J] |
| $\dot{W}$ | work power | [W] |
| z | height related to a specific reference level | [m] |
| $\eta_s$ | isentropic efficiency | |
| $\eta_{vol}$ | volumetric efficiency | |
| ρ | density | [kg/m³] |
| υ | speed | [m/s] | with the indices

| | |
|---|---|
| in | related to compressor inlet (12 in FIG. 3) |
| out | related to compressor outlet (16 in FIG. 3) |

The method is described for a compressor (10 in FIG. 3) where a fluid is compressed for an automotive air conditioning system. As fluid a refrigerant tetrafluorethane, also known as R-134a, is preferred, which can easily be liquefied at high pressure.

Figure 2:
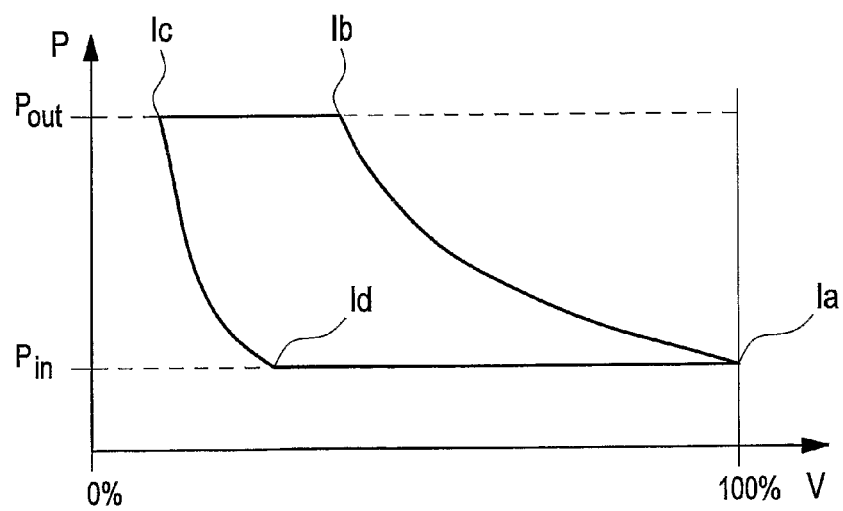
FIG. 2 an ideal pressure-volume diagram according to FIGS. 1$a$-1$d$.

An ideal compression cycle undergoes four processes that are distinguished by four important states illustrated in FIGS. 1a-1d. FIG. 2 illustrates a complete compression cycle in an ideal pressure-volume (PV)-diagram known from thermodynamics. Point 1a refers to FIG. 1a, point 1b to FIG. 1b, point 1c to FIG. 1c and point 1d to FIG. 1d.

In a cylinder 30, a piston 32 can move up and down along a cylinder axis. Depending on the axial position of the piston 32, a volume of a compression chamber 34 above the piston 32 is varied. In the compression chamber 34 the fluid is contained. The compression chamber 34 is opened or closed by a valve 36. In FIG. 1a, the fluid has been taken in at the low pressure side of the compressor and the compression chamber 34 has its maximum volume (point 1a in FIG. 2) at minimum pressure ($P_{in}$ in FIG. 2). In this position the pressure valve 36 is closing (indicated by an arrow in FIG. 1a) and the piston 32 starts to move upwards. As a result, the volume of the compression chamber 34 decreases with increasing pressure in the compression chamber 34. When the pressure in the cylinder 30 gets equal (FIG. 1b; point 1b in FIG. 2) to a predetermined maximum pressure ($P_{out}$ in FIG. 2), the valve 36 opens (indicated by an arrow in FIG. 1b) and the fluid squeezes out, and the piston 32 continues to go up thereby further decreasing the volume of the compression chamber 34 at constant maximum pressure ($P_{out}$ in FIG. 2) until the valve 36 closes (indicated by an arrow in FIG. 1c). The cylinder 32 has now reached its minimum volume 34 (FIG. 1c; point 1c in FIG. 2). When the piston 32 goes downwards, the volume of the compression chamber 34 increases and the fluid expands until the pressure gets equal to the predetermined minimum pressure ($P_{in}$ in FIG. 2) at the low pressure side of the compressor (FIG. 1d; point 1d in FIG. 2). Now the valve 36 is opening again (indicated by an arrow in FIG. 1d) and the piston 32 continues to go down thereby further increasing the volume of the compression chamber 34 with constant minimum pressure ($P_{in}$ in FIG. 2) until the maximum volume of the compression chamber 34 is reached (FIG. 1a, point 1a in FIG. 2) and the compression cycle is closed. A double-headed arrow symbolizes the variable displacement of the compressor D in FIG. 1a, which, for instance, can be varied by varying an inclination angle and/or a linear movement of a swash plate (not shown).

Figure 3:
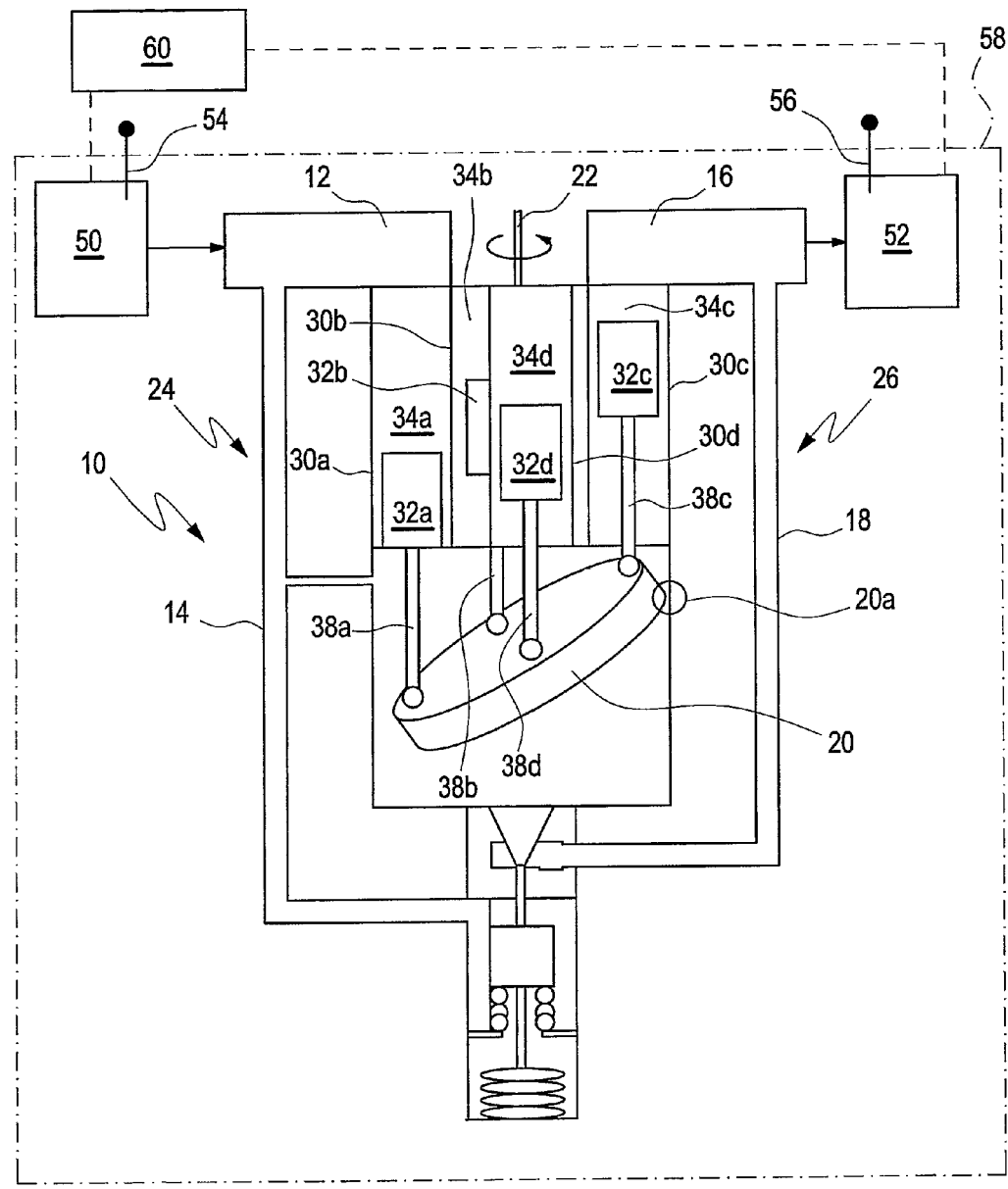
FIG. 3 schematically a preferred air conditioning system with a sketch of a preferred compressor.

FIG. 3 depicts schematically a preferred air conditioning system 58 comprising a compressor 10 (simplified illustration) with an inlet 12 (suction side) on a low pressure side 24 and an outlet 16 (discharge side) on a high pressure side 26. The inlet 12 forms a suction pressure zone and the outlet 16 forms a discharge pressure zone. Preferably the air conditioning system 58 is a vehicle air conditioning system.

The details of the compressor 10 are well known to a person skilled in the art and therefore not described explicitly. Upstream of the inlet 12 an evaporator 50 is arranged which is in operational fluid connection with the inlet 12. A temperature sensor 54 is mounted at the evaporator 54. Downstream of the outlet 16 a condenser 52 is provided in fluid connection with the outlet 16. A pressure sensor 56 is coupled to the outlet 16. Bypass conduits 14 and 18 are connected to the inlet 12 and the outlet 16, respectively. Unit 60 is a control unit controlling evaporator 50 and condenser 52. In the evaporator 50, the fluid to be compressed in the compressor 10 is evaporated, and in the condenser 52, the compressed fluid is cooled after compression. Preferably, unit 60 is an engine control unit operating the vehicle engine (not shown).

The compressor 10 contains several cylinders 30a, 30b, 30c, 30d and the same number of pistons 32a, 32b, 32c, 32d that all can rotate around a shaft 22 that transfers the torque. The cylinders 30a-30d are supplied with suitable valves (not shown) located at the inlet 12 and at the outlet 16. The valves are opened and closed in accordance with the compression cycle as depicted in FIG. 1 and FIG. 2.

The shaft 22 is coupled to the vehicle engine (not shown) and driven by the engine rotation. The refrigerant, which enters the compressor 10 as fluid through the inlet 12 enters the respective cylinder 30a . . . 30d at the inlet 12. In FIG. 3, as an example, cylinder 30a receives the fluid on the low pressure side 24. Then the cylinder 30a is rotated by the shaft 22 to the outlet 16. When the shaft 22 rotates, the piston 32a glides with its foot 38a on a swash plate 20 which is inclined compared with the axis of shaft 22. The swash plate 20 is used as a cam plate forcing the piston 32a upwards during the rotational movement of the cylinder 30a from the low pressure side 24 to the high pressure side 26 of the compressor 10 and downwards during the rotational movement of the cylinder 30a from the high pressure side 26 to the low pressure side 24 of the compressor 10.

This means that the inclined swash plate 20 converts rotation into a reciprocation of each piston 32a, 32b, 32c, 32d, which in turn alters correspondingly the volume of the compression chamber 34a, 34b, 34c, 34d for the fluid. For instance, the position of the cylinder 30a relative to the inclined swash plate 20 defines the stroke of its piston 32a, i.e. the displacement D of the compressor chamber 34a. Taking a situation as depicted in FIG. 3 where the piston 32a is at its lower inversion position with the maximum volume of the compression chamber 34a as a starting point, during rotation of the cylinder 30a the volume of the compression chamber 34a continuously decreases in the cylinder 30a and the fluid is continuously compressed until a predetermined maximum pressure when the valve at the outlet 16 opens and the fluid leaves the compression chamber 34a through the outlet 16 on the high pressure side 26 of the compressor 10. Continuing the rotational movement of the cylinder 30a the volume of the compression chamber 34a further decreases at constant maximum pressure until the compression chamber 34a has reached its minimum volume (and the piston 32a its upper inversion position). Further continuing the rotational movement of the cylinder 30a the volume of the compression chamber 34a increases again in the cylinder 30a, and the fluid is expanded thereby decreasing the pressure of the fluid until a predetermined minimum pressure when the valve at the inlet 12 opens and additional fluid is taken in into the compression chamber 34a through the inlet 12 on the low pressure side 26 of the compressor 10. Further continuing the rotational movement of the cylinder 30a the volume of the compression chamber 34a further increases at constant minimum pressure until the compression chamber 34a has reached its maximum volume (and the piston 32a has reached its lower inversion position as depicted in FIG. 3). This movement is recurrently repeated for each of the cylinders 30a-30d, i.e. each of the cylinders 30a-30d is subject to this rotation of the cylinder 30a-30d around the shaft 22 and caused by the rotation of the shaft 22 and the corresponding reciprocal linear movement of its piston 32a-32d caused by the inclined swash plate 20.

The inclination of the swash plate 20 can be changed by pivoting it around its joint 20a, e.g. dependent on operation conditions of the air conditioning system 58 the displacement of the compressor 10 can be altered.

Only three signals need to be used as input signals for the modelling of the behaviour of the compressor:

pressure $P_{out}$ downstream after compressor 10,
air temperature $T_{evap}$ downstream after evaporator 50,
rotational engine speed $\omega_{engine}$, wherein the compressor 10 is driven by the vehicle engine via shaft 22. It is a favourable benefit of the invention that it is not necessary to use a mass flow measure or a displacement measure, other than what has been used in art of air condition engineering.

The compressor torque M is computed in three steps. Firstly, the thermodynamic states are determined on both low and high pressure sides 24, 26 of the compressor 10. Then the displacement D is calculated and finally the torque M is computed by determining an energy balance on the compressor 10.

As the typical refrigerants, for instance the preferred refrigerant tetrafluorethane, usually cannot be treated as an ideal gas, and their thermodynamic properties usually cannot be computed by formulas containing constant thermal capacities, thermodynamic property tables for said refrigerants (as for instance tetrafluorethane) are preferably being used. Such tables can be found for example in various textbooks for the respective fluid used in the compressor 10. If two independent properties are given, a third arbitrary property can be determined from these tables according to proposition 1 as described before.

The sensor 54 measuring the ambient, particularly air temperature $T_{evap}$ after the evaporator 50 is used to determine the state upstream of the compressor 10. Since the fluid cools the air through heat exchange in the evaporator 50, the air and the fluid have approximately the same temperature downstream the evaporator 50 i.e.

$$T_{in}=T_{evap} \tag{e5}$$

On its way to the compressor 10 the temperature $T_{in}$ of the fluid changes only marginally. This small change can be neglected.

By approximating the pressure at the low pressure side 24 upstream of the compressor 10 as the saturation pressure, this property is determined. This can be done even though there is some superheating going on, as shown in FIG. 4.

Figure 4:
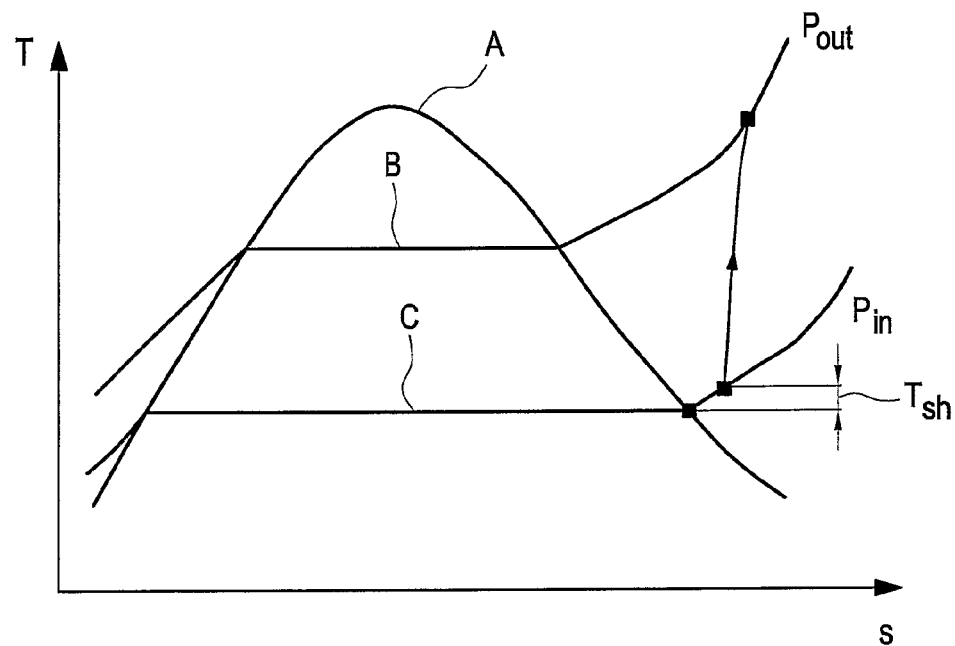
FIG. 4 a temperature-entropy diagram according to the ideal compression cycle in FIG. 2.

FIG. 4 depicts functional dependencies of temperature T vs. entropy s (T-s-diagram) known from thermodynamics for a compression process as indicated in FIGS. 1a-1d. Curve A represents a saturation curve, while curves B and C represent curves at constant pressure, i.e. minimum pressure $P_{in}$ (curve C) at the inlet 12 of the compressor 10 and maximum pressure $P_{out}$ (curve B) at the outlet 16 of the compressor 10, as described in FIG. 3.

In the saturated case, as indicated by curve A, the temperature T increases monotonically with increasing entropy s until a maximum temperature T is reached at a maximum of the curve A and drops monotonically behind the maximum with increasing entropy s. On the saturation curve A all the thermodynamic properties can be determined if one of them is known.

The area representing superheating is located to the right of the saturation curve A, and in this area the compression of the fluid in the compressor 10 is done. Superheating (sometimes referred to as boiling retardation, or boiling delay) is the phenomenon in which a liquid is heated to a temperature higher than its standard boiling point, without actually boiling. This can be caused by rapidly heating a homogeneous substance while leaving it undisturbed (so as to avoid the introduction of bubbles at nucleation sites).

For the fluid at minimum pressure $P_{in}$ the temperature T increases with increasing entropy s until a first intersection point of curves C and A at low entropy s and is constant beneath the saturation curve A. In this region, the pressure $P_{in}$ is constant. For higher entropy values, the curve C intersects curve A at a second intersection point at a higher entropy s and starts to rise again.

Curve B represents the fluid at maximum pressure $P_{out}$ which shows qualitatively the same behavior at a higher temperature level. Due to the higher temperature T for the maximum pressure $P_{out}$, the intersection points between curves A and B are located in between the intersection points of curves A and C. The region where pressure $P_{out}$ and temperature T are constant is accordingly smaller than for the minimum pressure $P_{in}$.

The amount of superheat $T_{sh}$, which is indicated in FIG. 4, is around 10 K, and represents the increase in temperature T when compressing the fluid during the upward movement of the piston 32 (see for instance FIGS. 1a-1d). As mentioned above, the compression of the fluid is done in the superheated area located to the right of the saturation curve A. The compression process experienced by the fluid between the minimum pressure $P_{in}$ at the inlet 12 to the maximum pressure $P_{out}$ at the outlet 16 of the compressor 10 is indicated by a line between curves B and C, which line is slightly curved towards higher entropy s, indicating not only a rise in temperature T but also a slight increase in entropy s during compression of the fluid.

The thermodynamic state is completely determined by a single property if the fluid is a saturated gas, and in this case it is sufficient to know the saturation temperature $T_{sat}$ given by $$T_{sat} = T_{in} - T_{sh} \quad (e6)$$

The pressure $P_{in}$ at the inlet 12 is then determined from tables listing saturated fluid properties (as for instance for a refrigerant as tetrafluorethane (R-134a) properties), $$T_{sat} \underset{\substack{tables \\ saturated\ fluid.e.g. \\ R-134a}}{\Rightarrow} P_{in} \quad (e7)$$

FIG. 4 is reflecting this relation, wherein on the right edge of the saturation curve A there is only one pressure value for $P_{in}$ corresponding to a specific temperature T at the intersection point of curves A and C.

With two known properties, the remaining ones are found in property tables covering the fluid in the compressor 10, for example superheated tetrafluorethane.

$$\left.\begin{array}{l} T_{in} \\ p_{in} \end{array}\right\} \underset{\substack{tables \\ superheated \\ fluid, \\ e.g.\ R-134a}}{\Rightarrow} \left\{\begin{array}{l} h_{in} \\ v_{in} \\ u_{in} \\ s_{in} \end{array}\right. \quad (e8)$$

Figure 5:
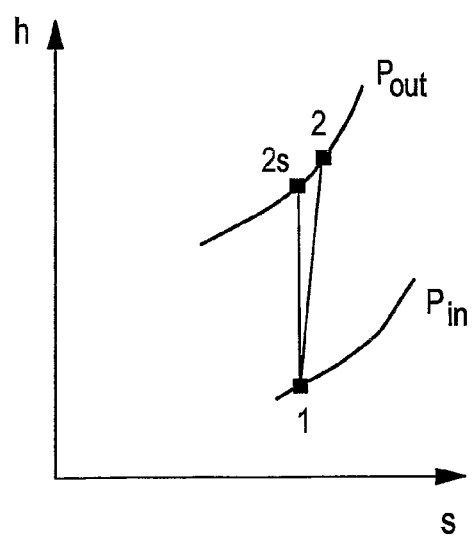
FIG. 5 enthalpy-entropy curves for an isentropic compressor and a real compressor.

Typically, compressors work almost isentropic and this can be used to determine the state at the outlet 16 of the compressor 10. Two possible compressor processes I-2s and I-2 are shown in FIG. 5 in an h-s diagram indication the functional dependence of the specific enthalpy h from the specific entropy s known in thermodynamics. The upper curve reflects the enthalpy-dependence on the entropy s of the maximum pressure $P_{out}$ at the outlet 16 and the lower curve the enthalpy-dependence on the entropy s of the minimum pressure $P_{in}$ at the inlet 12 of the compressor 10. Both curves increase monotonically in specific enthalpy h with increasing specific entropy s, revealing a higher specific enthalpy h for the higher pressure $P_{out}$ compared to the lower pressure $P_{in}$.

Two paths, I-2s and I-2, are drawn in showing the compression process from minimum pressure $P_{in}$ to maximum pressure $P_{out}$. The left path I-2s going from the lower curve $P_{in}$ at a lower enthalpy h to the upper curve $P_{out}$ with a higher enthalpy at constant entropy s is for an isentropic compressor 10, the right path I-2 is for a real compressor 10. If the compression is done without any increase in entropy s, which is hard to achieve in reality, the process path would look like the I-2s line. As a result of losses by friction, the entropy s will increase somewhat making the path look more like I-2 in FIG. 5, where an increase of the enthalpy h by moving from $P_{in}$ to $P_{out}$ results in an increase in entropy s in the fluid. The latter path I-2 corresponds to the real compressor process.

The compressor work is equal to the enthalpy difference over the compressor 10 when potential and kinetic energy are neglected. If the isentropic efficiency $n_s$ is defined as isentropic compressor work divided by real compressor work this results in $$\eta_s = \frac{h_{2s} - h_1}{h_2 - h_1} \quad (e9)$$

with indices according to the states in FIG. 5. Indices 1 and 2 correspond to the indices in and out used elsewhere.

Equation (e8) is used to determine the entropy $s_1$ at the compressor inlet 12. The entropy $s_{2s}$ is defined according to FIG. 5 and thus $$s_{2s} = s_1 \quad (e10)$$

The pressure $P_{out}$ at the outlet 16 is measured with the pressure sensor 56, and with two properties at 2s, the enthalpy h at that point can be determined, $$\left.\begin{array}{l} s_{2s} \\ p_{out} \end{array}\right\} \underset{\substack{tables \\ superheated \\ fluid.e.g. \\ R-134a}}{\Rightarrow} h_{2s} \quad (e11)$$

Another way to write equation (e9) is $$h_2 = \frac{h_{2s} - h_1}{\eta_s} + h_1 \tag{e12}$$

It is appropriate to put $n_s$=0.9 for this type of compressor 10. Finally the temperature $T_{out}$ is determined through the property tables, $$\left.\begin{array}{c} h_2 \\ p_{out} \end{array}\right\} \underset{\substack{tables \\ superheated \\ fluid\,e.g. \\ R-134a}}{\rightleftharpoons} T_{out} \tag{e13}$$

Remaining property values can be collected from the tables similar to equation (e8), $$\left.\begin{array}{c} T_{out} \\ p_{out} \end{array}\right\} \underset{\substack{tables \\ superheated \\ fluid\,e.g. \\ R-134a}}{\rightleftharpoons} \left\{\begin{array}{c} h_{out} \\ v_{out} \\ u_{out} \end{array}\right\} \tag{e14}$$

The compression ratio of the fluid in the compressor 10 is used to estimate the variable displacement D. This ratio is defined as the quotient of the fluid density at the outlet 16 and the fluid density at the inlet 12 of the compressor 10.

Figure 6:
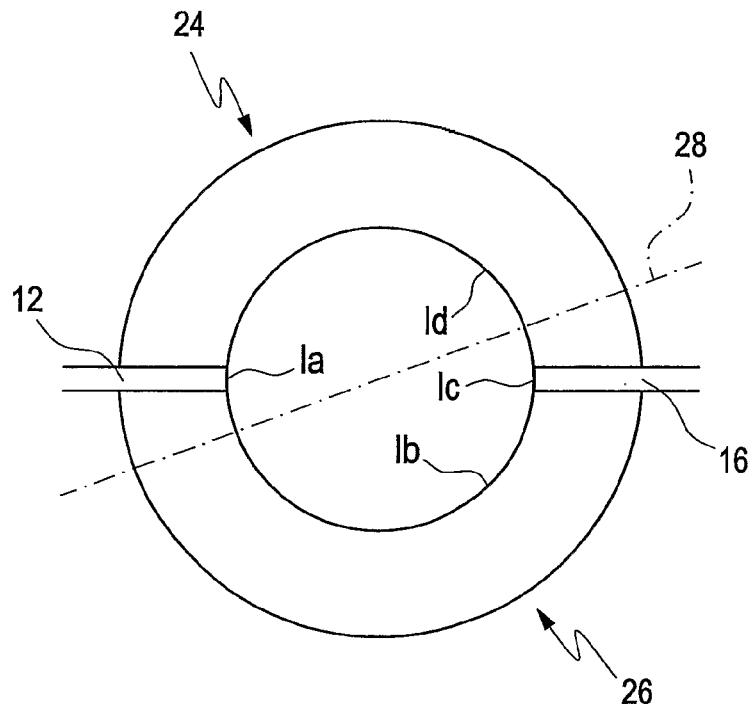
FIG. 6 a top view of the compressor in FIG. 3.

FIG. 6 is used to relate the compressor 10 in FIG. 3 to the ideal compression cycle described in FIG. 2 and FIG. 1a-1d. It shows a view of the compressor 10 as depicted in FIG. 3 from above. A specific cylinder 30a-30d going through a compression cycle can be studied by comparing the Figures. The valves 36a-36d are closing at Ia and Ic (FIG. 2) at maximum and minimum volume of the compression chambers 34a-34d, respectively. The valves 36a-36d are opening at Ib and Id (FIG. 2) whose location vary somewhat as a result of different high and low pressures in the high and low pressure sides 26, 24 of the compressor 10. The volume of the compression chamber 34a-34d decreases linearly in the direction of an axis (not shown) going from Ia to Ic (FIG. 2). The rotating cylinders 30a-30d are exposed to the high pressure below line 28 and exposed to the low pressure above the line 28 in the FIG. 6. Line 28 indicates a physical barrier between the low and the high pressure sides 24, 26 of the compressor 10.

It is assumed that just after the cylinder valve 36 (FIGS. 1a-1d) has been shut in Ia (FIG. 2), the valve 36 is exposed to the high pressure and a half revolution later, just after Ic (FIG. 2), the valve 36 is exposed to the low pressure again. The locations of the states Ib and Id vary and depend on existing pressures. State Ib occurs later, and with smaller volume the larger $P_{out}$ is, while state Id occurs earlier, and with smaller volume the larger $P_{in}$ is.

Letting $V_i$ denote the cylinder volume of the compression chamber 34a-34d at state i (with i corresponding to Ia, Ib, Ic, Id, see FIGS. 1a-1d and FIG. 2) and n be the number of cylinders 30a-30d in the compressor 10, the displacement D can be written as $$D=(V_a-V_d)n \tag{e15}$$

The mass $m_{in}$ entering a cylinder 30a-30d at the compressor inlet 12 between Id and Ia (FIG. 2), and the mass $m_{out}$ leaving the same cylinder 30a-30d later at the compressor outlet 16 between Ib and Ic (FIG. 2), are $$m_{in}=(V_a-V_d)\rho_{in} \tag{e16}$$

$$m_{out}=(V_b-V_c)\rho_{out} \tag{e17}$$

where $\rho$ denotes density of the fluid. Since there is no accumulation of mass these two masses $m_{in}$, $m_{out}$ must be equal, $$V_a - V_d = \frac{\rho_{out}}{\rho_{in}}(V_b - V_c) \tag{e18}$$

Swapping densities for specific volumes v and using (e15) and (e18) give $$D = \frac{v_{in}}{v_{out}}(V_b - V_c)n \tag{e19}$$

The specific volumes are given by equations (e8) and (e14), n is known and $V_c$ is constant since a change in the inclination of the swash plate 20 does not change the location of the piston 32a-32d closest to the joint 20a of the plate 20, see FIG. 3.

Holding the compressor rotational speed $\omega$ at a constant level, $V_b$ is a function of pressure as well as of the inclination of the swash plate 20. The function is not exactly known but can be estimated. Assume the inclination of the swash plate 20 has just increased by pivoting it downward around its joint 20a. If the valve 36 at Ib (FIG. 2) is opening at the same location as before $V_b$ would increase. On the other hand, a larger inclination implies larger compression ratio and higher pressure which causes the valve 36 to open later than before, i.e. Ib moves towards Ic (FIG. 2). The conclusion of this is that $V_b$ increases as a result of increasing inclination, but decreases as a result of increasing high pressure. For that reason, $V_b$ is approximated as a constant if the compressor rotational speed $\omega$ is constant, and this means that $V_b$ is a function of compressor rotational speed $\omega$ only.

Merging the constants and $V_b$ in equation (e19) to $\eta_{vol}K$ gives $$D = v_{vol}K\frac{v_{in}}{v_{out}} \tag{e20}$$

where K is a constant volume in the size of the minimum displacement D, $$K = \frac{(V_b - V_c)n}{\eta_{vol}} \tag{e21}$$

and $\eta_{vol}$ is the volumetric efficiency.

If the inclination of the swash plate 20 is constant, equation (e21) contains constants only apart from $\eta_{vol}$ and $V_b$. These variables are directly proportional with respect to each other according to the equation. The valve 36 (FIGS. 1a-1b) is opening in Ib (FIG. 2), but the opening process is taking some time and a high compressor rotational speed $\omega$ would mean that the cylinder 30a-30d will rotate a longer distance during this time. This way $V_b$ is decreasing which means that $\eta_{vol}$ is decreasing as well. The volumetric efficiency $\eta_{vol}$ can be assumed to decrease linearly from 1 to 0.5 with increasing compressor rotational speed ω.

The main equation of the preferred model is based on the principle of energy conservation presented in equation (e1). In its complete form it looks like $$\dot{Q}_{in} + \dot{W}_{in} + \dot{m}_{in}\left(h_{in} + \frac{v_{in}^2}{2} + gz_{in}\right) - \qquad (e22)$$
$$\dot{Q}_{out} - \dot{W}_{out} - \dot{m}_{out}\left(h_{out} + \frac{v_{out}^2}{2} + gz_{out}\right) =$$
$$\frac{d\left(m_{system}\left(u_{system} + \frac{v_{system}^2}{2} + gz_{system}\right) + \frac{I_{system}\omega_{system}^2}{2}\right)}{dt}$$

where the system is taken as the compressor 10. For a preferred embodiment of the system according to the invention a number of simplifications are done, Adiabatic process. $\Rightarrow \dot{Q}_{in} = \dot{Q}_{out} = 0$
Potential and kinetic flow energy are neglected $$h \gg \frac{v^2}{2} + gz.$$

The system does not do any work on the surrounding.
$\Rightarrow \dot{W}_{out} = 0$
No accumulation of mass in the system. $\Rightarrow \dot{m}_{in} = \dot{m}_{out} = \dot{m}$
The position of the compressor is fixed, thus no change in kinetic or potential energy.

$$\Rightarrow \frac{d\left(m_{system}\left(\frac{v_{system}^2}{2} + gz_{system}\right)\right)}{dt} = 0 \qquad (e23)$$

The first simplification is relatively gross since there is some heat generated in the compressor 10. The energy balance according to equation (e22) now turns into $$\dot{W}_{in} + \dot{m}(h_{in} - h_{out}) = \left(\frac{d\left(mu + \frac{I\omega_{comp}^2}{2}\right)}{dt}\right)_{system} \qquad (e24)$$

Since the provided power is equal to the compressor rotational speed times the compressor torque M, equation (e24) becomes $$w_{comp}M + \dot{m}(h_{in} - h_{out}) = \left(\frac{d\left(mu + \frac{I\omega_{comp}^2}{2}\right)}{dt}\right)_{system} \qquad (e25)$$

The mass flow $\dot{m}$ is a function of compressor rotational speed $\omega_{comp}$, displacement D and density ρ according to $$\dot{m} = \frac{\omega_{comp}}{2\pi}D\rho_{in} = \frac{\omega_{comp}}{2\pi}D\frac{1}{v_{in}} \qquad (e26)$$

where $\omega_{comp}$ is the compressor rotational speed in radians per second and D is the displacement in cubic meters per revolution.

While the compressor 10 is connected to the engine a constant gear ratio is achieved according to $$\omega_{comp} = k\omega_{engine} \qquad (e27)$$

where $\omega_{engine}$ is the engine rotational speed and k is the gear ratio. Both are known.

By solving equation (e25) for M and using the mass flow from equation (e26) and the compressor rotational speed $\omega_{comp}$ from equation (e27) the torque M can be expressed as $$M = \frac{D}{2\pi v_{in}}(h_{out} - h_{in}) + \frac{1}{k\omega_{engine}}\left(\frac{d\left(mu + \frac{Ik^2\omega_{engine}^2}{2}\right)}{dt}\right)_{system} \qquad (e28)$$

Replacing the displacement D with equation (e20) gives $$M = \frac{K}{2\pi v_{out}}(h_{out} - h_{in}) + \frac{1}{k\omega_{engine}}\left(\frac{d\left(mu + \frac{Ik^2\omega_{engine}^2}{2}\right)}{dt}\right)_{system} \qquad (e29)$$

where the state properties are given by equations (e8) and (e14).

$m_{system}$ is the mass of fluid in the compressor 10 and equals the displacement D multiplied by the density at the compressor inlet 12 from equation (e20) yields $$m_{system} = D\frac{1}{v_{in}} = \eta_{vol}K\frac{1}{v_{out}} \qquad (e30)$$

The specific internal energy u can not be determined since the fluid in the compressor 10 is not in thermal equilibrium. An approximation is made using the average value of the internal energy at the inlet 12 and outlet 16 of the compressor 10.

$$u_{system} = \frac{u_{in} + u_{out}}{2} \qquad (e31)$$

Figure 7:
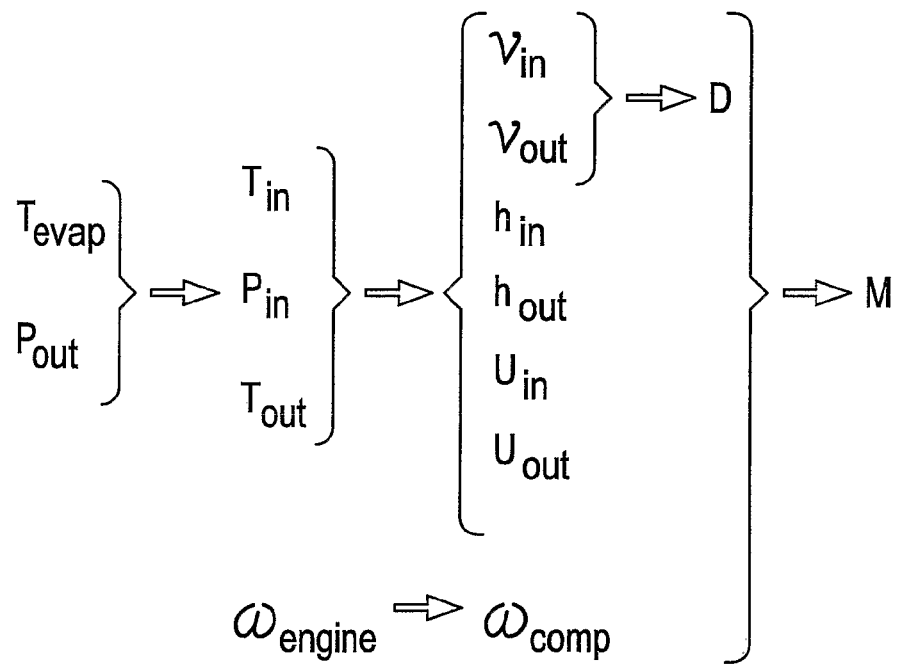
FIG. 7 a summary of a modeling on which a preferred method is based.

As a summary, FIG. 7 depicts the modeling on which the preferred method is based. FIGS. 2, 4 and 5 depict basic thermodynamical relations for a compression cycle depicted in FIG. 1. By measuring three signals $T_{evap}$, $P_{out}$ and $\omega_{engine}$. Knowing $T_{evap}$ and $P_{out}$ of the fluid, the parameters $T_{in}$, $P_{in}$ and $T_{out}$ of the fluid can be derived from equations (e5), (e7) and (e13). From the latter three parameters by applying equations (e8) and (e14) the specific volumes $v_{in}$ and $v_{out}$, as well as the specific entropies $h_{in}$, $h_{out}$ and energies $u_{in}$, $u_{out}$ are derived. Applying the equation (e20) to the specific volumes $v_{in}$ and $v_{out}$ yields the actual displacement D of the compressor 10, and applying equation (e29) to the displacement D, the specific entropies $h_{in}$, $h_{out}$ and specific energies $u_{in}$, $u_{out}$, the torque M of the compressor 10 is calculated. The compressor rotational speed 107 $_{comp}$ can easily be derived from the engine rotational speed $\omega_{engine}$ with equation (e27).

By calculating the actual displacement D, the actual temperature of the evaporator 50 (FIG. 3) can be controlled better as well as the control current of the control unit 60 for controlling the evaporator 50 (FIG. 3).

The invention is not restricted to the preferred embodiments described above. For instance, it is possible to use a variable displacement compressor without a swash plate or with a rotating swash plate instead of rotating cylinders and the like. The compressor displacement can be varied not only by variation of the inclination of the swash plate, influencing the active stroke of the cylinders 30a-30d, but also by linear movement of the swash plate away from or towards the cylinders 30a-30d, which influences the maximum shift of the pistons 32a-32d.

The invention claimed is:

1. A method for operating a variable-displacement compressor, wherein a volume of a compression chamber of at least one cylinder is varied during a compression cycle, wherein during the cycle the at least one cylinder is alternately coupled to a low pressure side and a high pressure side of the compressor, comprising
estimating a first thermodynamic state of the low pressure side using a temperature ($T_{evap}$) characteristic of a temperature ($T_{in}$) of a fluid at an inlet of the compressor and estimating a second thermodynamic state of the high pressure side using a pressure value ($P_{out}$) of the fluid at an outlet on high pressure side of the compressor,
estimating a current compression ratio (specific volume in/specific volume out $$\left(\frac{v_{in}}{v_{out}}\right)$$

of the compressor,
calculating a compressor displacement (D) as a function of the compression ratio $$\left(\frac{v_{in}}{v_{out}}\right),$$

estimating a compressor torque (M) depending on the calculated displacement (D) and the estimated first and second thermodynamic states,
providing the estimated compressor torque (M) to a control unit for operating the compressor or an engine coupled to the compressor, and
controlling operation of the compressor or the engine coupled to the compressor as a function of the estimated compressor torque (M).

2. The method according to claim 1, wherein the characteristic temperature ($T_{evap}$) is an ambient temperature measured at an evaporator in fluid connection with the inlet of the compressor.

3. The method according to claim 2, wherein from the characteristic temperature ($T_{evap}$) an input pressure value ($P_{in}$) of the fluid is determined.

4. The method according to claim 3, wherein a specific enthalpy ($h_{in}$), a specific volume ($v_{in}$), a specific internal energy ($u_{in}$) and a specific entropy ($s_{in}$) of the fluid at the inlet are determined, depending on the fluid temperature value ($T_{in}$) and the pressure value ($P_{in}$) of the fluid.

5. The method according to claim 2, wherein the pressure value of the fluid ($P_{out}$) is measured at the outlet.

6. The method according to claim 5, wherein an entropy ($s_{2s}$) at the outlet is set equal or at least approximately equal to an entropy ($s_1$) at the inlet.

7. The method according to claim 5, wherein an enthalpy ($h_{2s}$) is determined depending on the pressure value ($P_{out}$) of the fluid and the entropy ($S_{2s}$).

8. The method according to claim 7, wherein an outlet, temperature value ($T_{out}$) of the fluid at the outlet is determined depending on the enthalpy ($h_{2s}$) and the pressure value ($P_{out}$) of the fluid.

9. The method according to claim 5, wherein a specific enthalpy ($h_{out}$), a specific volume ($v_{out}$) and a specific internal energy ($u_{out}$) of the fluid at the outlet are determined depending on the temperature value ($T_{out}$) and the pressure value ($P_{out}$) of the fluid.

10. The method according to claim 1, wherein the displacement (D) is determined as a product of a volumetric efficiency ($n_{vol}$) and the compression ratio $$\left(\frac{v_{in}}{v_{out}}\right).$$

11. The method according to claim 1, wherein the compressor torque (M) is extracted from an energy balance over the compressor.

12. The method according to claim 1, wherein the torque (M) is extracted from the calculated displacement (D), a specific enthalpy ($h_{in}$) at the inlet, a specific enthalpy ($h_{out}$) at the outlet, a specific energy ($u_{in}$) at the inlet and a specific energy ($u_{out}$) at the outlet.

13. The method according to claim 1, wherein the torque (M) is compensated for operating an engine coupled to the compressor.

14. A system comprising
a variable displacement compressor,
an evaporator in operational connection with an inlet of the compressor,
a condenser in operational connection with an outlet of the compressor,
wherein the compressor is coupled to a control unit arranged to operate the compressor according to a method that causes a compressor torque to be provided depending on a calculated compressor displacement, wherein, in the compressor a volume of a compression chamber of at least one cylinder is varied during a compression cycle and during the cycle the at least one cylinder is alternately coupled to a low pressure side and a high pressure side of the compressor, the method comprising
estimating a first thermodynamic state of the low pressure side using a temperature ($T_{evap}$) characteristic of a temperature ($T_{in}$) of a fluid at an inlet of the compressor and estimating a second thermodynamic state of the high pressure side using a pressure value ($P_{out}$) of the fluid at an outlet on the high pressure side of the compressor,
estimating a current compression ratio (specific volume in/specific volume out $$\left(\frac{v_{in}}{v_{out}}\right)$$

of the compressor,
calculating, a compressor displacement (D) as a function of the compression ratio $$\left(\frac{v_{in}}{v_{out}}\right),$$

estimating, a compressor torque (M) depending on the calculated displacement (D) and the estimated first and second thermodynamic states, providing the estimated compressor torque (M) to the control unit for operating the compressor or an engine coupled to the compressor, and controlling operation of the compressor or the engine coupled to the compressor as a function of the estimated compressor torque (M).

15. The system according to claim 14, wherein a temperature sensor is coupled to the evaporator.

16. The system according to claim 14, wherein a pressure sensor is coupled to the outlet of the compressor.

17. The system according to claim 14, wherein the compressor is in fluid connection with an automotive based air conditioning system.

18. A non-transitory computer program product comprising a computer program code adapted to perform a method of for use in a method according to claim 1 when the program is run on a programmable microcomputer.

19. The non-transitory computer program product according to claim 18 adapted to be downloaded to a control unit or one of its components when run on a computer which is connected to the internet, wherein the control unit is coupled to a system comprising a variable displacement compressor, an evaporator in operational connection with an inlet of the compressor, a condenser in operational connection with an outlet of the compressor, wherein the compressor is coupled to the control unit, the control unit being capable of operating the compressor according to the method according to claim 1, providing a compressor torque (M) depending on a calculated compressor displacement (D).

20. A non-transitory computer program product stored on a computer readable medium, comprising a program code for use in a method according to claim 1 on a computer.

21. A non-transitory computer program product stored on a computer readable medium, comprising a program code for use in a method comprising at least the steps of estimating a first thermodynamic state of the low pressure side using a temperature ($T_{evap}$) characteristic of a temperature ($T_{in}$) of a fluid at an inlet of the compressor and estimating a second thermodynamic state of the high pressure side using a pressure value ($P_{out}$) of the fluid at an outlet on the high pressure side of the compressor, estimating a current compression ratio (specific volume in/specific volume out $$\left(\frac{v_{in}}{v_{out}}\right))$$

of the compressor, calculating, a compressor displacement (D) as a function of the compression ratio $$\left(\frac{v_{in}}{v_{out}}\right),$$

estimating, a compressor torque (M) depending on the calculated displacement (D) and the estimated first and second thermodynamic states, providing the estimated compressor torque to a control unit for operating the compressor or an engine coupled to the compressor, and controlling operation of the compressor or the engine coupled to the compressor as a function of the estimated compressor torque.

* * * * *